US012651316B2

(12) United States Patent (10) Patent No.: US 12,651,316 B2

Martucci (45) Date of Patent: Jun. 9, 2026

(54) ADAPTIVE DETAIL ENHANCEMENT OF IMAGES SYSTEMS AND METHODS

(71) Applicant: Teledyne FLIR Defense, Inc., Thousand Oaks, OR (US)

(72) Inventor: Stephen A. Martucci, Wilsonville, OR (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 165 days.

(21) Appl. No.: 18/465,820

(22) Filed: Sep. 12, 2023

(65) Prior Publication Data

US 2024/0087095 A1 Mar. 14, 2024

Related U.S. Application Data

(60) Provisional application No. 63/406,197, filed on Sep. 13, 2022.

(51) Int. Cl.
G06T 5/00 (2024.01)
G06T 3/40 (2024.01)
(Continued)

(52) U.S. Cl.
CPC .................. G06T 5/70 (2024.01); G06T 3/40 (2013.01); G06T 5/20 (2013.01); G06T 5/50 (2013.01);
(Continued)

(58) Field of Classification Search
CPC .... G06T 5/70; G06T 5/75; G06T 3/40; G06T 5/20; G06T 5/50; G06T 2207/20012;
(Continued)

(56) References Cited

U.S. PATENT DOCUMENTS

| | | | |
|---|---|---|---|
| 9,595,087 B2 | 3/2017 | Olsson | |
| 10,255,662 B2 | 4/2019 | Olsson | |
| 2016/0117794 A1* | 4/2016 | Ivanovic | ............... G06T 11/001 |
| | | | 345/596 |

OTHER PUBLICATIONS

NPL: NPL Results Publication Date Range: Nov. 4, 1999 to May 15, 2025.*

(Continued)

*Primary Examiner* — Quang N Vo
(74) *Attorney, Agent, or Firm* — Haynes and Boone, LLP

(57) ABSTRACT

Techniques are provided to adaptively enhance details of images. In one example, a method includes receiving a base image including a plurality of base pixels arranged in rows and columns. The method further includes performing a column-wise filtering process including processing subsets of the base pixels of each column selected by first and second sliding windows to generate a plurality of column-processed pixels. The method further includes performing a row-wise filtering process including processing subsets of the base pixels of each row selected by third and fourth sliding windows to generate a plurality of row-processed pixels. The method further includes combining the column-processed pixels and the row-processed pixels to generate a smoothed image that exhibits reduced detail in relation to the base image, and subtracting the smoothed image from the base image to provide a detail image. Additional methods and systems are also provided.

20 Claims, 5 Drawing Sheets

(51) Int. Cl.
G06T 5/20 (2006.01)
G06T 5/50 (2006.01)
G06T 5/70 (2024.01)
G06T 5/75 (2024.01)

(52) U.S. Cl.
CPC ...... *G06T 5/75* (2024.01); *G06T 2207/20012*
(2013.01); *G06T 2207/20216* (2013.01); *G06T*
*2207/20221* (2013.01); *G06T 2207/20224*
(2013.01)

(58) Field of Classification Search
CPC ............... G06T 5/2207; G06T 5/20216; G06T
2207/20221; G06T 2207/20224
See application file for complete search history.

(56) References Cited

OTHER PUBLICATIONS

He, Kaiming et al., "Guided Image Filtering", IEEE Transactions on
Pattern Analysis and Machine Intelligence, IEEE Computer Society,
2013, pp. 1-13, vol. 35.

* cited by examiner

400

RECEIVE ORIGINAL IMAGE — 410

PRE-PROCESS ORIGINAL IMAGE — 420

CREATE EDGE-PRESERVING SMOOTHED IMAGE — 430

POST-PROCESS SMOOTHED IMAGE — 440

OUTPUT ENHANCED IMAGE — 450

ADAPTIVE DETAIL ENHANCEMENT OF IMAGES SYSTEMS AND METHODS

CROSS REFERENCE TO RELATED APPLICATIONS

This application claims priority to and the benefit of U.S. Provisional Patent Application No. 63/406,197 filed Sep. 13, 2022 and entitled "ADAPTIVE DETAIL ENHANCEMENT OF IMAGES SYSTEMS AND METHODS," which is herein incorporated by reference in its entirety.

TECHNICAL FIELD

The present invention relates generally to image processing and, more particularly, to adaptive detail enhancement of images.

BACKGROUND

Various imaging processing devices may apply an unsharp masking method for image sharpening. Unsharp marking often includes applying a lowpass filter to an input image to create an unsharp (blurred) version of the image. The unsharp image is subtracted from the original image to extract high frequency details. The result is then multiplied by a user selectable gain factor, thereby boosting edges and details within the image. The boosted details are then added back into the input image, resulting in a sharpened output image.

A guided filter can be a more sophisticated alternative for blurring an image that better preserves edges. A guided filter can be implemented by first finding linear coefficients for each pixel in the input image, and then using the linear coefficients to generate output pixels, where the linear coefficients are computed over a window centered at a pixel that supports a smoothing filter.

These various techniques may utilize different amounts of processing resources and/or other factors. As a result, applying only a single processing technique without discretion may result in inefficient allocation of processing resources and/or other drawbacks.

SUMMARY

According to various embodiments of the present disclosure, a method includes receiving a base image including a plurality of base pixels arranged in rows and columns. The method further includes performing a column-wise filtering process including processing subsets of the base pixels of each column selected by first and second sliding windows to generate a plurality of column-processed pixels. The method further includes performing a row-wise filtering process including processing subsets of the base pixels of each row selected by third and fourth sliding windows to generate a plurality of row-processed pixels. The method further includes combining the column-processed pixels and the row-processed pixels to generate a smoothed image that exhibits reduced detail in relation to the base image. The method further includes subtracting the smoothed image from the base image to provide a detail image.

According to various embodiments of the present disclosure, a system includes a logic device. The logic device is configured to receive a base image including a plurality of base pixels arranged in rows and columns. The logic device is configured to perform a column-wise filtering process including processing subsets of the base pixels of each column selected by first and second sliding windows to generate a plurality of column-processed pixels. The logic device is configured to perform a row-wise filtering process including processing subsets of the base pixels of each row selected by third and fourth sliding windows to generate a plurality of row-processed pixels. The logic device is configured to combine the column-processed pixels and the row-processed pixels to generate a smoothed image that exhibits reduced detail in relation to the base image. The logic device is configured to subtract the smoothed image from the base image to provide a detail image.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Embodiments of the present disclosure provide systems and methods for adaptive detail enhancement of images to create a sharpened image. Embodiments may be based on unsharp masking principles for image sharpening plus a guided filter operation for an image blur process step to achieve improved visual results in a computationally efficient way (e.g., decreased computational complexity and latency). Embodiments may be adaptive to local characteristics of the image in a small neighborhood of each processed pixel.

Figure 1:
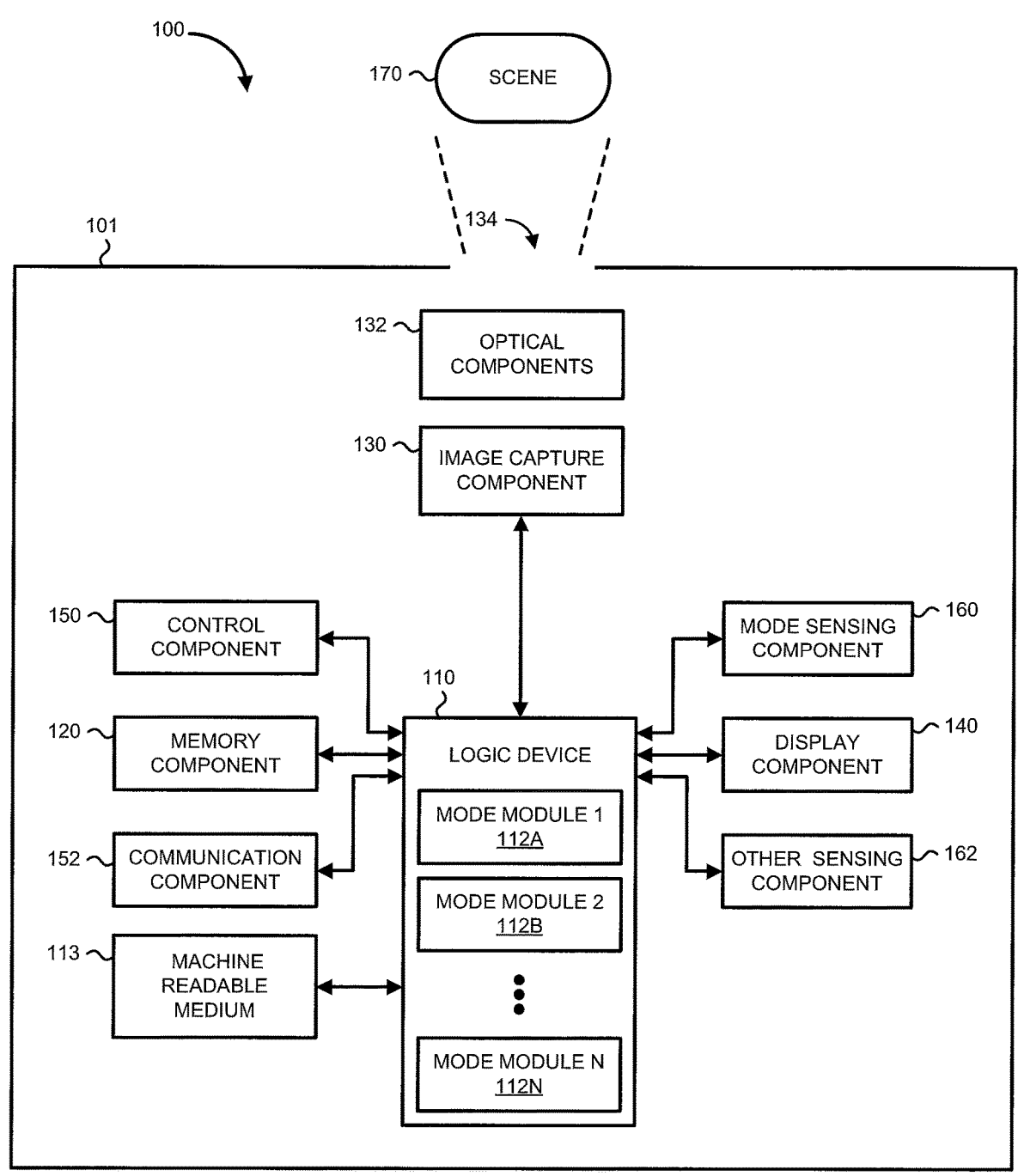
FIG. 1 illustrates a block diagram of an imaging system, in accordance with an embodiment of the disclosure.

FIG. 1 illustrates a block diagram of an imaging system 100 in accordance with an embodiment of the disclosure. Imaging system 100 may be used to capture and process image frames in accordance with various techniques described herein. In one embodiment, various components of imaging system 100 may be provided in a housing 101, such as a housing of a camera, a personal electronic device (e.g., a mobile phone), or other system. In another embodiment, one or more components of imaging system 100 may be implemented remotely from each other in a distributed fashion (e.g., networked or otherwise).

In one embodiment, imaging system 100 includes a logic device 110, a memory component 120, an image capture component 130, optical components 132 (e.g., one or more lenses configured to receive electromagnetic radiation through an aperture 134 in housing 101 and pass the electromagnetic radiation to image capture component 130), a display component 140, a control component 150, a communication component 152, a mode sensing component 160, and a sensing component 162.

In various embodiments, imaging system 100 may implemented as an imaging device, such as a camera, to capture image frames, for example, of a scene 170 (e.g., a field of view). Imaging system 100 may represent any type of camera system which, for example, detects electromagnetic radiation (e.g., irradiance) and provides representative data (e.g., one or more still image frames or video image frames). For example, imaging system 100 may represent a camera that is directed to detect one or more ranges (e.g., wavebands) of electromagnetic radiation and provide associated image data. Imaging system 100 may include a portable device and may be implemented, for example, as a handheld device and/or coupled, in other examples, to various types of vehicles (e.g., a land-based vehicle, a watercraft, an aircraft, a spacecraft, or other vehicle) or to various types of fixed locations (e.g., a home security mount, a campsite or outdoors mount, or other location) via one or more types of mounts. In still another example, imaging system 100 may be integrated as part of a non-mobile installation to provide image frames to be stored and/or displayed.

Logic device 110 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or or any other appropriate combination of processing device and/or memory to execute instructions to perform any of the various operations described herein. Logic device 110 is adapted to interface and communicate with components 120, 130, 140, 150, 160, and 162 to perform method and processing steps as described herein. Logic device 110 may include one or more mode modules 112A-112N for operating in one or more modes of operation (e.g., to operate in accordance with any of the various embodiments disclosed herein). In one embodiment, mode modules 112A-112N are adapted to define processing and/or display operations that may be embedded in logic device 110 or stored on memory component 120 for access and execution by logic device 110. In another aspect, logic device 110 may be adapted to perform various types of image processing techniques as described herein.

In various embodiments, it should be appreciated that each mode module 112A-112N may be integrated in software and/or hardware as part of logic device 110, or code (e.g., software or configuration data) for each mode of operation associated with each mode module 112A-112N, which may be stored in memory component 120. Embodiments of mode modules 112A-112N (i.e., modes of operation) disclosed herein may be stored by a machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored mode modules 112A-112N provided to imaging system 100 by coupling the machine readable medium 113 to imaging system 100 and/or by imaging system 100 downloading (e.g., via a wired or wireless link) the mode modules 112A-112N from the machine readable medium (e.g., containing the non-transitory information). In various embodiments, as described herein, mode modules 112A-112N provide for improved camera processing techniques for real time applications, wherein a user or operator may change the mode of operation depending on a particular application, such as an off-road application, a maritime application, an aircraft application, a space application, or other application.

Memory component 120 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In one embodiment, logic device 110 is adapted to execute software stored in memory component 120 and/or machine-readable medium 113 to perform various methods, processes, and modes of operations in manner as described herein.

Image capture component 130 includes, in one embodiment, one or more sensors (e.g., any type of visible light, infrared, and/or any other type of electro-optical detector, or other type of detector, including a detector implemented as part of a focal plane array) for capturing image signals representative of an image of scene 170. In one embodiment, the sensors of image capture component 130 provide for representing (e.g., converting) a captured thermal image signal of scene 170 as digital data (e.g., via an analog-to-digital converter included as part of the sensor or separate from the sensor as part of imaging system 100).

Logic device 110 may be adapted to receive image signals from image capture component 130, process image signals (e.g., to provide processed image data), store image signals or image data in memory component 120, and/or retrieve stored image signals from memory component 120. Logic device 110 may be adapted to process image signals stored in memory component 120 to provide image data (e.g., captured and/or processed image data) to display component 140 for viewing by a user.

Display component 140 includes, in one embodiment, an image display device (e.g., a liquid crystal display (LCD)) or various other types of generally known video displays or monitors. Logic device 110 may be adapted to display image data and information on display component 140. Logic device 110 may be adapted to retrieve image data and information from memory component 120 and display any retrieved image data and information on display component 140. Display component 140 may include display electronics, which may be utilized by logic device 110 to display image data and information. Display component 140 may receive image data and information directly from image capture component 130 via logic device 110, or the image data and information may be transferred from memory component 120 via logic device 110.

In one embodiment, logic device 110 may initially process a captured thermal image frame and present a processed image frame in one mode, corresponding to mode modules 112A-112N, and then upon user input to control component 150, logic device 110 may switch the current mode to a different mode for viewing the processed image frame on display component 140 in the different mode. This switching may be referred to as applying the camera processing techniques of mode modules 112A-112N for real time applications, wherein a user or operator may change the mode while viewing an image frame on display component 140 based on user input to control component 150. In various aspects, display component 140 may be remotely positioned, and logic device 110 may be adapted to remotely display image data and information on display component 140 via wired or wireless communication with display component 140, as described herein.

Control component 150 includes, in one embodiment, a user input and/or interface device having one or more user actuated components, such as one or more push buttons, slide bars, rotatable knobs or a keyboard, that are adapted to generate one or more user actuated input control signals. Control component 150 may be adapted to be integrated as part of display component 140 to operate as both a user input device and a display device, such as, for example, a touch screen device adapted to receive input signals from a user touching different parts of the display screen. Logic device 110 may be adapted to sense control input signals from control component 150 and respond to any sensed control input signals received therefrom.

Control component 150 may include, in one embodiment, a control panel unit (e.g., a wired or wireless handheld control unit) having one or more user-activated mechanisms (e.g., buttons, knobs, sliders, or others) adapted to interface with a user and receive user input control signals. In various embodiments, the one or more user-activated mechanisms of the control panel unit may be utilized to select between the various modes of operation, as described herein in reference to mode modules 112A-112N. In other embodiments, it should be appreciated that the control panel unit may be adapted to include one or more other user-activated mechanisms to provide various other control operations of imaging system 100, such as auto-focus, menu enable and selection, field of view (FoV), brightness, contrast, gain, offset, spatial, temporal, and/or various other features and/or parameters. In still other embodiments, a variable gain signal may be adjusted by the user or operator based on a selected mode of operation.

In another embodiment, control component 150 may include a graphical user interface (GUI), which may be integrated as part of display component 140 (e.g., a user actuated touch screen), having one or more images of the user-activated mechanisms (e.g., buttons, knobs, sliders, or others), which are adapted to interface with a user and receive user input control signals via the display component 140. As an example for one or more embodiments as discussed further herein, display component 140 and control component 150 may represent appropriate portions of a smart phone, a tablet, a personal digital assistant (e.g., a wireless, mobile device), a laptop computer, a desktop computer, or other type of device.

Mode sensing component 160 includes, in one embodiment, an application sensor adapted to automatically sense a mode of operation, depending on the sensed application (e.g., intended use or implementation), and provide related information to logic device 110. In various embodiments, the application sensor may include a mechanical triggering mechanism (e.g., a clamp, clip, hook, switch, push-button, or others), an electronic triggering mechanism (e.g., an electronic switch, push-button, electrical signal, electrical connection, or others), an electromechanical triggering mechanism, an electro-magnetic triggering mechanism, or some combination thereof. For example for one or more embodiments, mode sensing component 160 senses a mode of operation corresponding to the imaging system's 100 intended application based on the type of mount (e.g., accessory or fixture) to which a user has coupled the imaging system 100 (e.g., image capture component 130). Alternatively, the mode of operation may be provided via control component 150 by a user of imaging system 100 (e.g., wirelessly via display component 140 having a touch screen or other user input representing control component 150).

Furthermore, in accordance with one or more embodiments, a default mode of operation may be provided, such as for example when mode sensing component 160 does not sense a particular mode of operation (e.g., no mount sensed or user selection provided). For example, imaging system 100 may be used in a freeform mode (e.g., handheld with no mount) and the default mode of operation may be set to handheld operation, with the image frames provided wirelessly to a wireless display (e.g., another handheld device with a display, such as a smart phone, or to a vehicle's display).

Mode sensing component 160, in one embodiment, may include a mechanical locking mechanism adapted to secure the imaging system 100 to a vehicle or part thereof and may include a sensor adapted to provide a sensing signal to logic device 110 when the imaging system 100 is mounted and/or secured to the vehicle. Mode sensing component 160, in one embodiment, may be adapted to receive an electrical signal and/or sense an electrical connection type and/or mechanical mount type and provide a sensing signal to logic device 110. Alternatively, or in addition, as discussed herein for one or more embodiments, a user may provide a user input via control component 150 (e.g., a wireless touch screen of display component 140) to designate the desired mode (e.g., application) of imaging system 100.

Logic device 110 may be adapted to communicate with mode sensing component 160 (e.g., by receiving sensor information from mode sensing component 160) and image capture component 130 (e.g., by receiving data and information from image capture component 130 and providing and/or receiving command, control, and/or other information to and/or from other components of imaging system 100).

In various embodiments, mode sensing component 160 may be adapted to provide data and information relating to system applications including a handheld implementation and/or coupling implementation associated with various types of vehicles (e.g., a land-based vehicle, a watercraft, an aircraft, a spacecraft, or other vehicle) or stationary applications (e.g., a fixed location, such as on a structure). In one embodiment, mode sensing component 160 may include communication devices that relay information to logic device 110 via wireless communication. For example, mode sensing component 160 may be adapted to receive and/or provide information through a satellite, through a local broadcast transmission (e.g., radio frequency), through a mobile or cellular network and/or through information beacons in an infrastructure (e.g., a transportation or highway information beacon infrastructure) or various other wired or wireless techniques (e.g., using various local area or wide area wireless standards).

In another embodiment, imaging system 100 may include one or more other types of sensing components 162, including environmental and/or operational sensors, depending on the sensed application or implementation, which provide information to logic device 110 (e.g., by receiving sensor information from each sensing component 162). In various embodiments, other sensing components 162 may be adapted to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., laser rangefinder), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 162 may include devices that relay information to logic device 110 via wireless communication. For example, each sensing component 162 may be adapted to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques. In some embodiments, other sensing components 162 may include one or more motion sensors (e.g., accelerometers, gyroscopes, micro-electromechanical system (MEMS) devices, and/or others as appropriate).

In various embodiments, components of imaging system 100 may be combined and/or implemented or not, as desired or depending on application requirements, with imaging system 100 representing various operational blocks of a system. For example, logic device 110 may be combined with memory component 120, image capture component 130, display component 140, and/or mode sensing component 160. In another example, logic device 110 may be combined with image capture component 130 with only certain operations of logic device 110 performed by circuitry (e.g., a processor, a microprocessor, a microcontroller, a logic device, or other circuitry) within image capture component 130. In still another example, control component 150 may be combined with one or more other components or be remotely connected to at least one other component, such as logic device 110, via a wired or wireless control device so as to provide control signals thereto.

In some embodiments, communication component 152 may be implemented as a network interface component (NIC) adapted for communication with a network including other devices in the network. In various embodiments, communication component 152 may include a wireless communication component, such as a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components adapted for communication with a network. As such, communication component 152 may include an antenna coupled thereto for wireless communication purposes. In other embodiments, the communication component 152 may be adapted to interface with a DSL (e.g., Digital Subscriber Line) modem, a PSTN (Public Switched Telephone Network) modem, an Ethernet device, and/or various other types of wired and/or wireless network communication devices adapted for communication with a network.

In various embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) adapted to communicate with other communication networks, such as the Internet. As such, in various embodiments, the imaging system 100 may be associated with a particular network link such as for example a URL (Uniform Resource Locator), an IP (Internet Protocol) address, and/or a mobile phone number.

Figure 2:
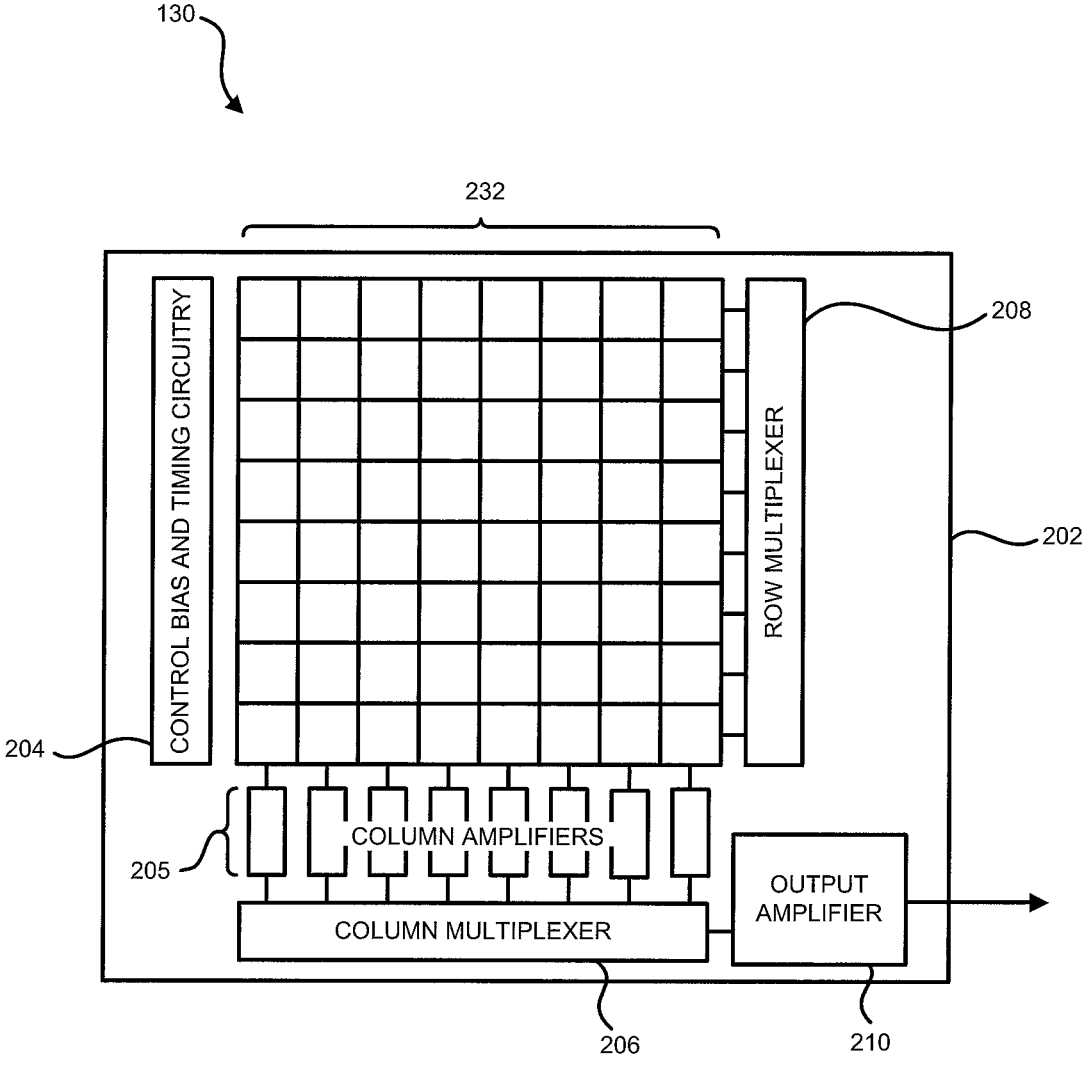
FIG. 2 illustrates a block diagram of an image capture component, in accordance with an embodiment of the disclosure.

FIG. 2 illustrates a block diagram of image capture component 130 in accordance with an embodiment of the disclosure. In this illustrated embodiment, image capture component 130 is a thermal imager implemented as a focal plane array (FPA) including an array of unit cells 232 and a read out integrated circuit (ROIC) 202. Each unit cell 232 may be provided with an infrared detector (e.g., a microbolometer or other appropriate sensor) and associated circuitry to provide image data for a pixel of a captured thermal image frame. In this regard, time-multiplexed electrical signals may be provided by the unit cells 232 to ROIC 202.

ROIC 202 includes bias generation and timing control circuitry 204, column amplifiers 205, a column multiplexer 206, a row multiplexer 208, and an output amplifier 210. Image frames captured by infrared sensors of the unit cells 232 may be provided by output amplifier 210 to logic device 110 and/or any other appropriate components to perform various processing techniques described herein. Although an 8 by 8 array is shown in FIG. 2, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated by reference herein in its entirety.

Figure 3:
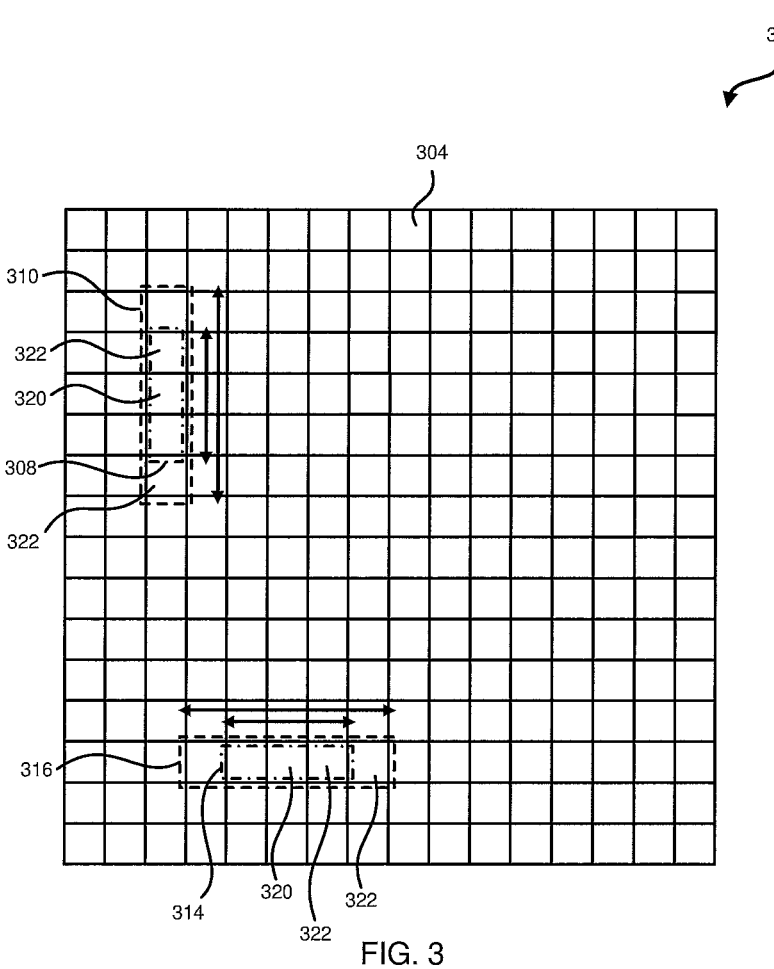
FIG. 3 illustrates an image frame with associated first and second window kernels, in accordance with an embodiment of the disclosure.

FIG. 3 illustrates an image frame 300 (e.g., provided by image capture component 130), in accordance with an embodiment of the disclosure. Although image frame 300 is represented as a 16 by 16 pixel image frame, any desired size may be used. As shown, image frame 300 includes a plurality of pixels 304 arranged in columns and rows. In accordance with the techniques discussed herein, various groups (e.g., sets or neighborhoods) of pixels 304 may be identified, also referred to as kernels or windows. The kernels or windows may be associated with a row or column of pixels 304. For example, FIG. 3 identifies a first window 308 and a second window 310 associated with a column of pixels 304. First and second windows 308, 310 may be of various sizes, such as of the same size or of different sizes to each other. For example, as shown, first window 308 is a 1×3 pixel kernel, and second window 310 is a 1×5 pixel kernel, although other configurations are contemplated. FIG. 3 also identifies a third window 314 and a fourth window 316 associated with a row of pixels 304. Third and fourth windows 314, 316 may be of various sizes, such as of the same size or of different sizes to each other. For instance, as shown, third window 314 is a 1×3 pixel kernel, and fourth window 316 is a 1×5 pixel kernel, although other configurations are contemplated.

Each window may include a grid of pixels 304 having a center pixel 320 and neighbor pixels 322. For example, first window 308 includes a center pixel 320 and two vertically adjacent neighbor pixels 322, second window 310 includes a center pixel 320 and four vertically adjacent neighbor pixels 322, third window 314 includes a center pixel 320 and two horizontally adjacent neighbor pixels 322, and fourth window 316 includes a center pixel 320 and four horizontally adjacent neighbor pixels 322. In embodiments, first and second windows 308, 310 may share the same center pixel 320, such that first and second windows 308, 310 filter the same pixel 304. Similarly, third and fourth windows 314, 316 may share the same center pixel 320, such that third and fourth windows 314, 316 filter the same pixel 304. Although particular kernel sizes of 1×3 and 1×5 are shown, different kernel sizes may be used in any embodiments discussed herein as appropriate. In some embodiments, first window 308 includes a window/kernel size smaller than second window 310. Similarly, third window 314 may include a window/kernel size smaller than fourth window 316.

As described in more detail below, first window 308, second window 310, third window 314, and/or fourth window 316 may be used to apply one or more imaging effects, such as blurring, sharpening, or edge detection, based on pixel values of the center pixel 320 compared to neighboring pixels 322. In embodiments, each of first window 308 and second window 310 may slide vertically along one or more columns of image frame 300 to support adaptive enhancement of one or more details in image frame 300, as described in detail below. Similarly, each of third window 314 and fourth window 316 may slide horizontally along one or more rows of image frame 300 to support adaptive enhancement of one or more details in image frame 300, as detailed below. For example, the differences in image processing values associated between first window 308 and second window 310 and/or the differences in image processing values associated between third window 314 and fourth window 316 may be used to smooth an input image for creating a sharpened image, as detailed below.

Figure 4:
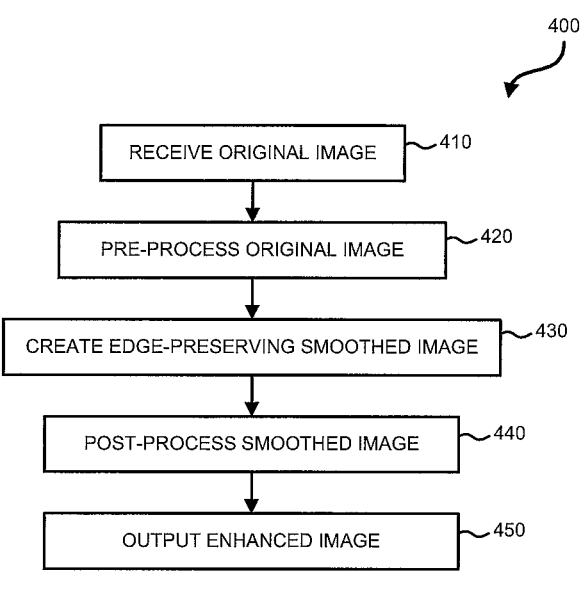
FIG. 4 illustrates a process of adaptively enhancing details of images, in accordance with an embodiment of the disclosure.

FIG. 4 illustrates a process 400 of adaptively enhancing details of images, in accordance with an embodiment of the disclosure. In embodiments, process 400 may be performed by logic device 110 of imaging system 100, such as an image processing pipeline provided by logic device 110. In some embodiments, process 400 may be performed during runtime operation of imaging system 100 to permit real-time image/edge sharpening of IR and EO imagery. Note that one or more operations in FIG. 4 may be combined, omitted, and/or performed in a different order as desired.

In block 410, process 400 includes receiving an original image. For instance, imaging system 100 may capture the original image, such as image capture component 130 capturing image signals representative of an image of scene 170. The image signals from image capture component 130 may be received by logic device 110, such as in a manner as described above with reference to FIG. 1. In embodiments, the original image may be captured by a different system, device or module and passed to the logic device 110 in other manners (e.g., via wired or wireless communication or the like).

In block 420, process 400 includes pre-processing the original image. In embodiments, block 420 includes contrast-stretching the original image to create a contrast-adjusted image or frame. The contrast-adjusted image/frame may be created using a variety of methods, including, but not limited to, linear or nonlinear scaling of image pixel values from a minimum value to a maximum value and saturating the pixel values above or below the minimum and maximum values, respectively. This process can be applied globally, locally, or a combination of both globally and locally. In embodiments, block 420 may include applying a look-up-table (LUT) (e.g., a global LUT), or a different method of image histogram modification, to map pixel values of the original image to new values. The above embodiments are illustrative only, and block 420 may include other methods of pre-processing the original image.

In block 430, process 400 includes creating an edge-preserving smoothed image that exhibits reduced detail in relation to original image. In embodiments, block 430 includes applying a two-dimensional (2D) guided filter to the original image and/or the pre-processed image (i.e., a base or input image) to create a filtered image. For instance, block 430 may include applying vertical and horizontal one-dimensional (1D) filters to the base image, which can be done in parallel or otherwise performed independent from each other. The vertical and horizontal 1D filters operate independently on the same input image and therefore affect the input image in similar, unbiased ways. For example, the base image may be vertically filtered and processed, and horizontally filtered and processed in parallel or otherwise independent from each other. Depending on the application, each 1D filter may utilize a box filter, a triangle filter, or a Gaussian, or other, low-pass filter.

In embodiments, block 430 may include using parameters to guide a per-pixel blending of the filtered image with the original image or the pre-processed image in each of the vertical and horizontal dimensions. The per-pixel blending in each of the vertical and horizontal dimensions may be performed independently. The vertically and horizontally blended images may be combined to create the smoothed image. For example, the vertically blended image and the horizontally blended image may be averaged to produce the smoothed image.

In block 440, process 400 includes post-processing the smoothed image. In block 440, a detail image may be produced based on a difference between the smoothed image and the base image, the detail image providing enhanced and/or sharpened details in relation to the original image (e.g., enhanced details of scene 170). For instance, the smoothed image may be subtracted from the base image to create the detail image, although other methods are contemplated. In embodiments, block 440 may include scaling the detail image by a gain value (e.g., to produce a scaled detail image). In embodiments, block 440 may include combining the base image with the scaled detail image (e.g., to produce an enhanced image). In embodiments, block 440 may include other post-processing steps. For example, block 440 may include adjusting the enhanced image by a brightness value.

In block 450, process 400 includes outputting the enhanced image. For example, the enhanced image may be outputted to display component 140 of imaging system 100. In embodiments, block 450 may include outputting the enhanced image to a separate device, system, or module.

Figure 5:
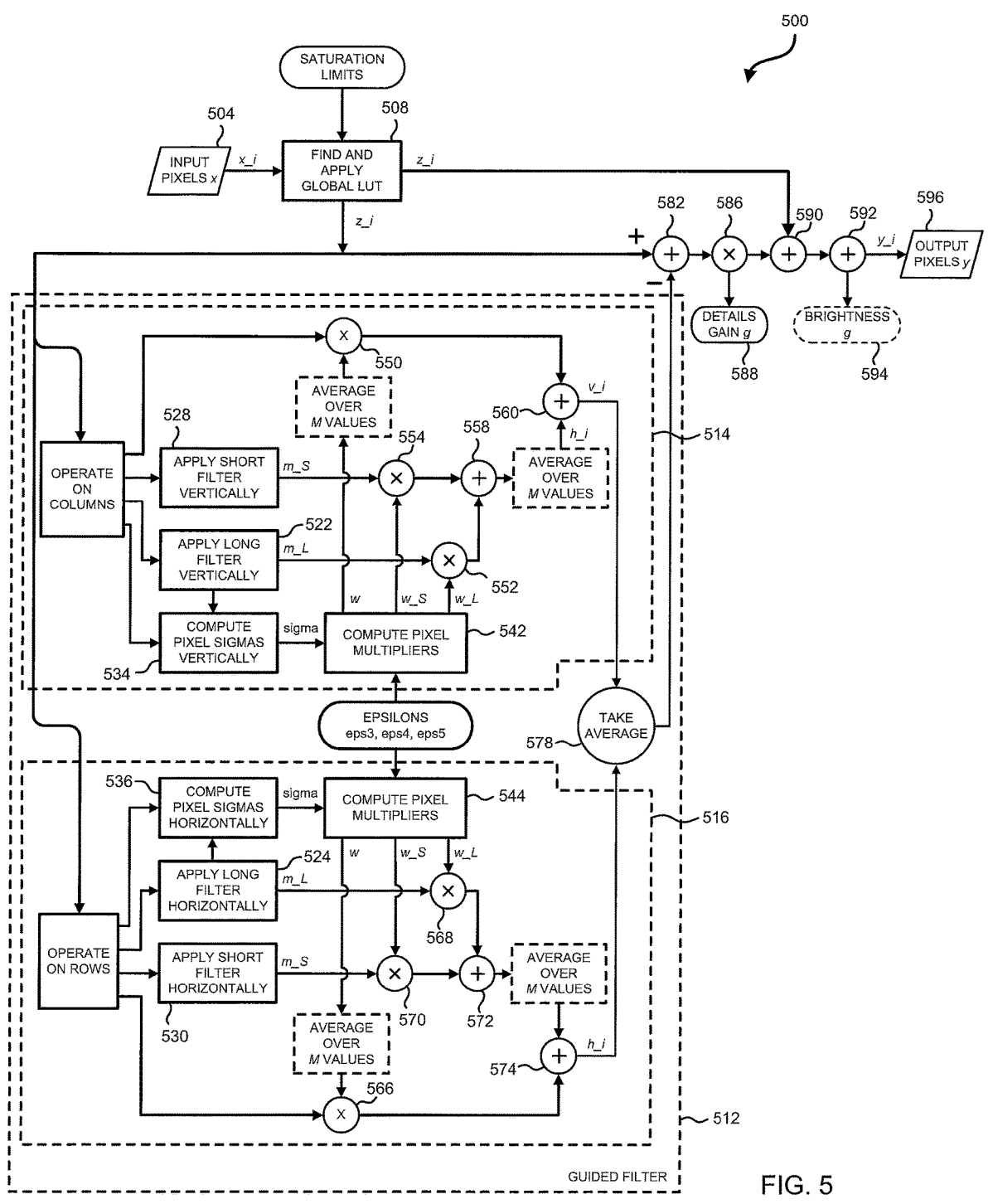
FIG. 5 illustrates another process of adaptively enhancing details of images, in accordance with an embodiment of the disclosure.

FIG. 5 illustrates another process 500 of adaptively enhancing details of images, in accordance with an embodiment of the disclosure. In embodiments, process 500 may be performed by logic device 110 of imaging system 100, such as an image processing pipeline provided by logic device 110. In some embodiments, process 500 may be performed during runtime operation of imaging system 100 to permit real-time image/edge sharpening of IR and EO imagery. Note that one or more operations in FIG. 5 may be combined, omitted, and/or performed in a different order as desired. In embodiments, process 500 provides further details of process 400 of FIG. 4, described above.

In block 504, process 500 includes receiving input pixels $x_i$ of an input image. For example, block 504 may include receiving input pixels $x_i$ from the original image received in block 410 of FIG. 4, described above.

In embodiments, process 500 includes one or more pre-processing steps or processes, such as in a manner as described above with reference to block 420 of FIG. 4. For example, in block 508, process 500 includes finding and applying a histogram modification to the input pixels $x_i$ to generate adjusted pixels $z_i$. For instance, block 508 may include contrast-stretching the input pixels $x_i$, such as in block 420 of FIG. 4, described above. In embodiments, block 508 may include finding and applying a LUT to the input pixels $x_i$. For example, a LUT may be created to map pixel values of the input image to new values, so that a histogram of the result fills the full display range of the image's bit depth, and in a way that distributes the pixel values for further processing. In embodiments, block 508 may include computing an intermediate output (e.g., $z_i=LUT(x_i)$) at each pixel index i. In embodiments, block 508 may receive saturation limits to control the histogram modification of the input pixels $x_i$.

In block 512, process 500 includes performing a guided filter operation, such as in a manner as described above with reference to block 430 of FIG. 4, to produce a smoothed image that exhibits reduced detail in relation to base image. For example, block 512 may receive a base image including a plurality of base pixels (e.g., input pixels $x_i$ or adjusted pixels $z_i$) arranged in rows and columns, and process the base image to produce a smoothed image. As shown, block 512 includes performing filtering and/or processing operations of the adjusted pixels $z_i$ in two dimensions (e.g., along the rows and columns of the base image), with filtering in each dimension preferably performed independently (e.g., in parallel) and then combined to produce the smoothed image. For example, in block 514, process 500 may include performing a first filtering along at least one column of the base image (e.g., a column-wise filtering process). In block 516, process 500 may include performing a second filtering along at least one row of the base image (e.g., a row-wise filtering process). In embodiments, the row-wise filtering process may be performed independent from the column-wise filtering process (e.g., independent from each other), as detailed below. Although illustrated as performing filtering and/or processing operations of the adjusted pixels $z_i$, block 512 may include performing filtering and/or processing operations of the input pixels $x_i$.

Block 514 may be applied to operate on columns of the adjusted pixels $z_i$. In embodiments, the column-wise filtering process of block 514 includes identifying and extracting first pixels of the base image in at least one first window sliding along at least one column of the base image to produce a first filtered image. For example, the column-wise filtering process includes processing subsets of the base pixels (e.g., adjusted pixels $z_i$) of each column selected by first and second sliding windows of different sizes (e.g., first window 308, second window 310) to generate a plurality of column-processed pixels. In embodiments, the column-wise filtering process may include identifying and/or extracting the input pixels $x_i$ in a moving window along each column to yield an output pixel value (e.g., for each input pixel $x_i$ in each column of the input or base image, perform vertical processing of the pixels in a 1D odd-length window centered at that pixel).

Block 516 may be applied to operate on rows of the adjusted pixels $z_i$. In embodiments, the row-wise filtering process of block 516 includes identifying and extracting second pixels of the base image in at least one second window sliding along at least one row of the base image to produce a second filtered image. For instance, the row-wise filtering process includes processing subsets of the base pixels (e.g., adjusted pixels $z_i$) of each row selected by third and fourth sliding windows of different sizes (e.g., third window 314, fourth window 316) to generate a plurality of row-processed pixels. In embodiments, the row-wise filtering process may include identifying and/or extracting the input pixels $x_i$ in a moving window along each row to yield an output pixel value (e.g., for each input pixel $x_i$ in each row of the input or base image, perform horizontal processing of the pixels in a 1D odd-length window centered at that pixel).

Each of the column-wise and row-wise filtering processes may include performing multiple filtering operations of the base image/pixels. For example, the column-wise filtering process of block 514 may include processing the subsets of the base pixels of each column selected by first and second sliding windows 308, 310 to generate a plurality of first and second processed pixels, respectively. Similarly, the row-wise filtering process of block 516 may include processing the subsets of the base pixels of each row selected by third and fourth sliding windows 314, 316 to generate a plurality of third and fourth processed pixels, respectively.

As shown, a first filtering operation of base pixels may be performed at blocks 522 and 524. For example, at block 522, a long filter may be applied vertically (e.g., on columns using second sliding window 310), and at block 524, a long filter may be applied horizontally (e.g., on rows using fourth sliding window 316). Similarly, a second filtering operation of base pixels may be performed at blocks 528 and 530. For instance, at block 528, a short filter may be applied vertically (e.g., on columns using first sliding window 308), and at block 530, a short filter may be applied horizontally (e.g., on rows using third sliding window 314). In embodiments, the long and short filters in each dimension may be performed in parallel, although other configurations are contemplated.

The long filter operations may be performed using a first window size (e.g., a 1×5 kernel size of FIG. 3, described above) to produce a long filter output image (e.g., long-filtered processed pixels m L). In embodiments, the long filter may produce the long-filtered processed pixels m L per the equation below. At each pixel index i:

$m_L$=N-pt one-dimensional mean centered at $x_i$, (has unity gain).

Alternatively, the long-filtered processed pixels m L may be produced per the equations below (or any other rounding method to make m L an integer), at each pixel index i:

$$\text{define the fractional fixed parameter } invN = \frac{1}{N},$$

$$Nm_L = N\text{--}pt \text{ one--dimensional sum centered at } x_i,$$

$$m_L = \text{floor}(invN * Nm_L)$$

The short filter operations may be performed using a second window size (e.g., a 1×3 kernel size of FIG. 3, described above) smaller than the first window size to produce a short filter output image (e.g., short-filtered processed pixels $m_s$). In embodiments, the short filter may produce the short-filtered processed pixels $m_s$ per the equation below. At each pixel index i:

$$m_S = \frac{(x_{i-1} + 2x_i + x_{i+1})}{4}, \text{ (has unity gain)}.$$

In block 534, block 514 may include computing one or more vertical pixel sigmas. In block 536, block 516 may include computing one or more horizontal pixel sigmas. For example, block 534 may use input pixels $x_i$ and the output from block 522 (i.e., M L calculated through the first filtering operation) to compute a 1D vertical sigma G. Likewise, block 536 may use input pixels $x_i$ and the output from block 524 (i.e., $m_L$ calculated through the second filtering operation) to compute a 1D horizontal sigma $\sigma_H$. In embodiments, blocks 534 and 536 may be performed in parallel, although other configurations are contemplated. In embodiments, the pixel sigmas may be calculated at each pixel index i based on the following:

σ=N-pt one-dimensional mean of absolute differences between each pixel in the window and the $m_L$ at the window's center.

Alternatively, the pixel sigmas (i.e., $m_L$) may be computed per the equations below (or any other rounding method to make a an integer), at each pixel index i:

$$\text{define the fractional fixed parameter } invN = \frac{1}{N},$$

$N_\sigma$=N-pt one-dimensional mean of absolute differences between each pixel in the window and the $m_L$ at the window's center, $$\sigma=\text{floor}(invN*N_\sigma)$$

The computations of the pixel sigmas illustrated above are illustrative only, and other computations are contemplated. For example, the pixel sigmas may be calculated based on a standard deviation, such as the square root of the mean of the squared differences from the mean.

With continued reference to FIG. 5, each of the column-wise filtering process of block 514 and the row-wise filtering process of block 516 may include combining (e.g., linearly) the long-filtered processed pixels $m_L$, the short-filtered processed pixels $m_s$, and the base image/pixels to produce a blended image. For example, $m_L$ from block 522, $m_s$ from block 528, and input pixels $x_i$ may be combined in block 514 to produce a first blended image $v_i$. In like manner, $m_L$ from block 524, $m_s$ from block 530, and input pixels $x_i$ may be combined in block 516 to produce a second blended image $h_i$.

In embodiments, the blending may be based on one or more weighting factors. For example, the column-wise filtering process may include weighting $m_L$ from block 522 and $m_s$ from block 528 to generate the column-processed pixels. In like manner, the row-wise filtering process may include weighting $m_L$ from block 524 and $m_s$ from block 530 to generate the row-processed pixels. In block 542, block 514 may include computing first weighting factors (e.g., three vertical weighting factors) using vertical sigma $\sigma_v$ and one or more vertical epsilons. Similarly, in block 544, block 516 may include computing second weighting factors (e.g., three horizontal weighting factors) using horizontal sigma $\sigma_H$ and one or more horizontal epsilons.

The vertical and horizontal epsilons may include multiple epsilons, such as three epsilons $\varepsilon_3$, $\varepsilon_4$, and $\varepsilon_5$. $\varepsilon_4$ may modify how the short-filter output is blended with the input image/ frame. For example, $\varepsilon_4$ may be set to 0 for 100% input frame and set to an increasingly larger number to use more of short-filter output. The larger the associated sigma ($e_4$), the more of the input image/frame and the less of the short-filter output is used, thereby reducing the amount of blur at the pixel. $\varepsilon_5$ may modify how the long-filter output is blended with the input image/frame. For example, $\varepsilon_5$ may be set to 0 for 100% input frame and set to an increasingly larger number to use more of long-filter output. The larger the associated sigma ($e_5$), the more of the input image/frame and the less of the long-filter output is used, thereby reducing the amount of blur at the pixel. $\varepsilon_3$ may control blending of the modified short-filtered output and the modified long-filtered output. For example, $\varepsilon_5$ may be set to 0 for 100% modified short-filtered output and set to an increasingly larger number to use more of modified long-filter output. The larger the associated sigma ($e_3$), the more of the modified short-filter output and the less of the modified long-filter output is used. The three weighting factors may include a first weighting factor $w_L$ associated with the first filter output image (i.e., $m_L$ from block 522 or $m_L$ from block 524), a second weighting factor $w_S$ associated with the second filter output image (i.e., $m_s$ from block 528 or $m_s$ from block 530), and a third weighting factor w associated with the base image (i.e., input pixels $x_i$).

The epsilons and weighting factors may be calculated, at each pixel index i, according to the following equations:

$$e_3 = \frac{1}{\sigma + \varepsilon_3},$$

$$e_4 = \frac{1}{\sigma + \varepsilon_4},$$

$$e_5 = \frac{1}{\sigma + \varepsilon_5},$$

$$w_L = (\varepsilon_3 * \varepsilon_5) * e_3 * e_5,$$

$$w_S = \varepsilon_4 * \sigma * e_3 * e_4,$$

$$w = 1 - (w_L + w_S)$$

Alternatively, the weighting factors may be calculated, at each pixel index i, according to the following equations:

$$w_L = (\varepsilon_3 * \varepsilon_5) * (\sigma + \varepsilon_4),$$

$$w_S = \varepsilon_4 * (\sigma + \varepsilon_3) * \sigma,$$

$$w = (\varepsilon_3 * (\sigma + \varepsilon_4) * \sigma) + ((\sigma + \varepsilon_5) * \sigma^2),$$

$$d = (\sigma + \varepsilon_3) * (\sigma + \varepsilon_4) * (\sigma + \varepsilon_5).$$

The filtered and input images may be blended in many configurations. For example, block 514 may use the vertical weighting factors calculated in block 542 to linearly combine the two vertical filter outputs (i.e., $m_L$ from block 522 and $m_s$ from block 528) and the base image (i.e., input pixels $x_i$). For instance, vertical weighting factor w may be applied to the base image at block 550, vertical weighting factor w L may be applied to the vertically long-filtered output image (i.e., $m_L$ from block 522) at block 552, and vertical weighting factor $w_s$ may be applied to the vertically short-filtered output image (i.e., $m_s$ from block 528) at block 554. In embodiments, the vertically long-filtered output image and the vertically short-filtered output image may be combined at block 558 and then combined with the base image at block 560 to produce first blended image $v_i$. In embodiments, first blended image $v_i$ may be produced based on one or more averages over M values, using the following alternative equations, at each pixel index i:

$$v_i = x_i * M-pt \text{ mean of } (w) + M-pt \text{ mean of } (w_L * m_L + w_S * m_S),$$

$$\text{or } v_i = x_i * M-pt \text{ mean of } \left(\frac{w}{d}\right) + M-pt \text{ mean of } \left(\frac{w_L * m_L + w_S * m_S}{d}\right).$$

Similarly, block 516 may use the horizontal weighting factors calculated in block 544 to linearly combine the two horizontal filter outputs (i.e., $m_L$ from block 524 and $m_s$ from block 530) and the base image (i.e., input pixels $x_i$). For instance, horizontal weighting factor w may be applied to the base image at block 566, horizontal weighting factor $w_L$ may be applied to the horizontally long-filtered output image (i.e., $m_L$ from block 524) at block 568, and horizontal weighting factor w s may be applied to the horizontally short-filtered output image (i.e., $m_s$ from block 530) at block 570. In embodiments, the horizontally long-filtered output image and the horizontally short-filtered output image may be combined at block 572 and then combined with the base image at block 574 to produce second blended image $h_i$. In embodiments, second blended image $h_i$ may be produced based on one or more averages over M values, using the following alternative equations, at each pixel index i:

$$h_i = x_i * M - pt \text{ mean of } (w) + M - pt \text{ mean of } (w_L * m_L + w_S * m_S),$$

$$\text{or } h_i = x_i * M - pt \text{ mean of } \left(\frac{w}{d}\right) + M - pt \text{ mean of } \left(\frac{w_L * m_L + w_S * m_S}{d}\right).$$

In block 578, process 500 includes combining the column-processed pixels and the row-processed pixels, such as combining first blended image $v_i$ and second blended image $h_i$, to produce a smoothed image. For instance, block 578 includes averaging first blended image $v_i$ with second blended image $h_i$ to produce the smoothed image, although other configurations are contemplated. As described herein, the smoothed image may exhibit reduced detail in relation to the base image.

In block 582, process 500 includes producing a detail image based on a combination of the base image and the smoothed image, the detail image providing enhanced and/or sharpened details in relation to the original image (e.g., enhanced details of scene 170). For example, the detail image may be based on a difference between the smoothed image and the base image. In embodiments, block 582 may include subtracting the smoothed image from the base image to produce the detail image, although other configurations are contemplated.

In embodiments, process 500 includes one or more post-processing processes, such as in a manner as described above with reference to block 440 of FIG. 4. For example, in block 586, process 500 may include scaling the detail image by a gain value 588 to produce a scaled detail image. In block 590, process 500 may include combining the base image with the scaled detail image to produce an enhanced image. In block 592, process 500 may include adjusting the enhanced image by a brightness value 594 to produce an output image $y_i$. In embodiments, at each pixel index i of the smoothed image and a given gain g and a given brightness b, the output image or pixels $y_i$ may be calculated according to the following equation:

$$y_i = g\left(x_i - \frac{v_i - h_i}{2}\right) + z_i + b$$

In block 596, process 500 includes outputting the output image $y_i$, such as in a manner as described above with reference to block 450 of FIG. 4. For example, output image $y_i$ may be outputted to display component 140 of imaging system 100, although other configurations are contemplated. For example, block 596 may include outputting output image $y_i$ to a separate device, system, or module.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving a base image comprising a plurality of base pixels arranged in rows and columns;
   performing a column-wise filtering process comprising processing subsets of the base pixels of each column selected by first and second sliding windows to generate a plurality of column-processed pixels;
   performing a row-wise filtering process comprising processing subsets of the base pixels of each row selected by third and fourth sliding windows to generate a plurality of row-processed pixels;
   combining the column-processed pixels and the row-processed pixels to generate a smoothed image that exhibits reduced detail in relation to the base image; and
   subtracting the smoothed image from the base image to provide a detail image.

2. The method of claim 1, wherein:
   the column-wise filtering process comprises:
      processing the subsets of the base pixels of each column selected by the first and second sliding windows to generate a plurality of first and second processed pixels, respectively, and
      weighting the first and second processed pixels to generate the column-processed pixels; and
   the row-wise filtering process comprises:
      processing the subsets of the base pixels of each row selected by the third and fourth sliding windows to generate a plurality of third and fourth processed pixels, respectively, and
      weighting the third and fourth processed pixels to generate the row-processed pixels.

3. The method of claim 2, further comprising:
   wherein the column-wise filtering process comprises linearly combining the first processed pixels, the second processed pixels, and the base pixels based on first weighting factors to produce a first blended image;
   wherein the row-wise filtering process comprises linearly combining the third processed pixels, the fourth processed pixels, and the base pixels based on second weighting factors to produce a second blended image; and averaging the first blended image with the second blended image to generate the smoothed image.

4. The method of claim 1, wherein the column-wise filtering process and the row-wise filtering process are performed independent from each other.

5. The method of claim 4, wherein the column-wise filtering process and the row-wise filtering process are performed in parallel.

6. The method of claim 1, wherein:
the column-wise filtering process comprises blending the column-processed pixels with the base pixels to produce a first blended image;
the row-wise filtering process comprises blending the row-processed pixels with the base pixels to produce a second blended image; and
the first blended image and the second blended image are combined to generate the smoothed image.

7. The method of claim 1, further comprising:
scaling the detail image by a gain value to produce a scaled detail image; and
combining the base image with the scaled detail image to produce an enhanced image.

8. The method of claim 1, wherein:
the first and second sliding windows are of different sizes; and
the third and fourth sliding windows are of different sizes.

9. The method of claim 1, wherein:
the first and second sliding windows share a same first center pixel; and
the third and fourth sliding windows share a same second center pixel.

10. The method of claim 1, further comprising applying a look-up-table to a captured image to produce the base image.

11. A system comprising:
a logic device configured to:
receive a base image comprising a plurality of base pixels arranged in rows and columns,
perform a column-wise filtering process comprising processing subsets of the base pixels of each column selected by first and second sliding windows to generate a plurality of column-processed pixels,
perform a row-wise filtering process comprising processing subsets of the base pixels of each row selected by third and fourth sliding windows to generate a plurality of row-processed pixels,
combine the column-processed pixels and the row-processed pixels to generate a smoothed image that exhibits reduced detail in relation to the base image, and
subtract the smoothed image from the base image to provide a detail image.

12. The system of claim 11, wherein:
the column-wise filtering process comprises:
processing the subsets of the base pixels of each column selected by the first and second sliding windows to generate a plurality of first and second processed pixels, respectively, and
weighting the first and second processed pixels to generate the column-processed pixels; and
the row-wise filtering process comprises:
processing the subsets of the base pixels of each row selected by the third and fourth sliding windows to generate a plurality of third and fourth processed pixels, respectively, and
weighting the third and fourth processed pixels to generate the row-processed pixels.

13. The system of claim 12, wherein:
the column-wise filtering process comprises linearly combining the first processed pixels, the second processed pixels, and the base pixels based on first weighting factors to produce a first blended image;
the row-wise filtering process comprises linearly combining the third processed pixels, the fourth processed pixels, and the base pixels based on second weighting factors to produce a second blended image; and
the logic device is configured to average the first blended image with the second blended image to generate the smoothed image.

14. The system of claim 11, wherein the column-wise filtering process and the row-wise filtering process are performed independent from each other.

15. The system of claim 14, wherein the column-wise filtering process and the row-wise filtering process are performed in parallel.

16. The system of claim 11, wherein:
the column-wise filtering process comprises blending the column-process pixels with the base pixels to produce a first blended image;
the row-wise filtering process comprises blending the row-processed pixels with the base pixels to produce a second blended image; and
the first blended image and the second blended image are combined to generate the smoothed image.

17. The system of claim 11, wherein the logic device is configured to:
scale the detail image by a gain value to produce a scaled detail image; and
combine the base image with the scaled detail image to produce an enhanced image.

18. The system of claim 11, wherein:
the first and second sliding windows are of different sizes; and
the third and fourth sliding windows are of different sizes.

19. The system of claim 11, wherein:
the first and second sliding windows share a same first center pixel; and
the third and fourth sliding windows share a same second center pixel.

20. The system of claim 11, wherein the logic device is configured to apply a look-up-table to a captured image to produce the base image.

* * * * *